Figure 1:
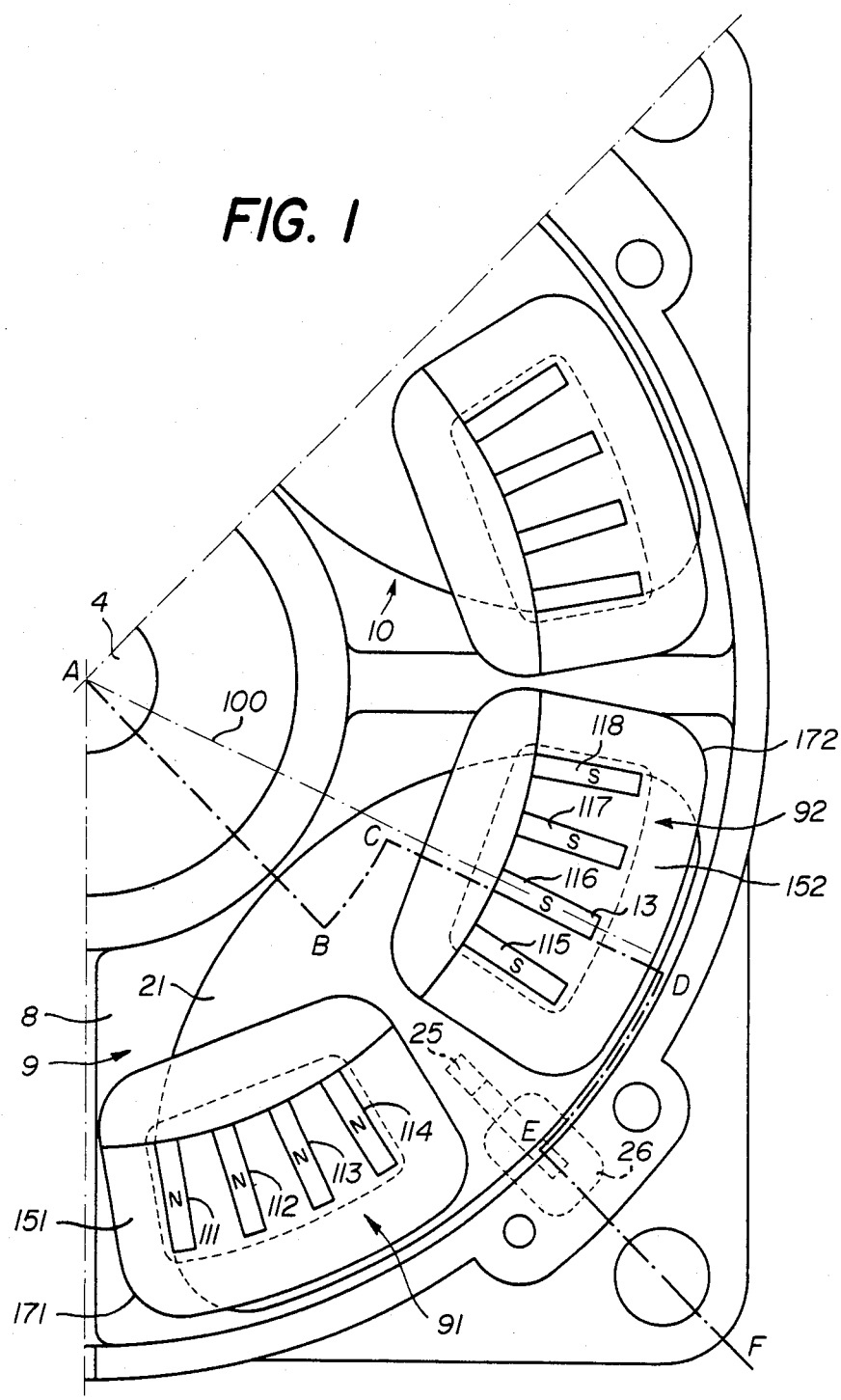

United States Patent [19]

Oudet

[11] Patent Number: 4,518,883
[45] Date of Patent: May 21, 1985

[54] ELECTRIC MOTOR WITH PERMANENT MAGNET ROTOR

[75] Inventor: Claude Oudet, Besancon, France

[73] Assignee: Portescap, La Chaux de Fonds, Switzerland

[21] Appl. No.: 530,585

[22] PCT Filed: Dec. 3, 1982

[86] PCT No.: PCT/CH82/00127

§ 371 Date: Aug. 3, 1983

§ 102(e) Date: Aug. 3, 1983

[87] PCT Pub. No.: WO83/02042

PCT Pub. Date: Jun. 9, 1983

[30] Foreign Application Priority Data

Dec. 4, 1981 [CH] Switzerland ............... 7766/81

[51] Int. Cl.³ ............................................. H02K 1/18
[52] U.S. Cl. ................................. 310/49 R; 310/268
[58] Field of Search ............ 310/49 R, 268, 156, 310/162

[56] References Cited

U.S. PATENT DOCUMENTS

| 3,392,293 | 7/1968 | De Boo et al. | 310/49 |
|---|---|---|---|
| 3,426,225 | 2/1969 | Bakhuizen | 310/49 R |
| 3,784,850 | 1/1974 | Inaba et al. | 310/49 R |
| 4,007,387 | 2/1977 | Rustecki | 310/162 |
| 4,079,018 | 3/1978 | Noack | 252/389 R |
| 4,095,150 | 6/1978 | Senckel | 310/268 |
| 4,155,018 | 5/1979 | Oudet | 310/49 R |
| 4,242,623 | 12/1980 | Oudet et al. | 318/696 |
| 4,330,727 | 5/1982 | Oudet | 310/268 |

FOREIGN PATENT DOCUMENTS

| 0015764 | 9/1980 | European Pat. Off. |
| 2729446 | 1/1979 | Fed. Rep. of Germany |
| 1469257 | 2/1967 | France |
| 2121040 | 8/1972 | France |
| 2439502 | 5/1980 | France |
| 6414562 | 6/1966 | Netherlands |
| 2067025 | 7/1981 | United Kingdom |

Primary Examiner—William H. Beha, Jr.
Assistant Examiner—D. L. Rebsch
Attorney, Agent, or Firm—Cushman, Darby & Cushman

[57] ABSTRACT

The motor according to the invention comprises a disc-shaped rotor with multipolar permanent magnetization along an annular area and a stator comprising a plurality of magnetic circuits (9, 10, ...) arranged so that the magnetic field is comprised within the two cylindrical face portions based on the magnetized annular area and located on either side of the rotor. Means for compensation of the harmonics of the current-free torque and of the current torque are provided, as well as the arrangement of magnetic pick-ups (25, 26). The invention applies to industrial synchronous motor which may operate as stepping motors.

18 Claims, 5 Drawing Figures

ELECTRIC MOTOR WITH PERMANENT MAGNET ROTOR

The present invention relates to an electrical stepper motor comprising on the one hand a permanently magnetized rotative part which is mounted on the motor shaft and presents a rotational symmetry about it, this part having a small thickness as compared to its outer diameter and being magnetized in the direction of its thickness so as to present on each of its opposite faces 2N magnetic poles of alternating polarity, N being a natural number, these poles being arranged regularly along an annular zone, and comprising, on the other hand, at least one magnetic stator circuit and at least two electric coils coupled with this magnetic circuit, each circuit comprising at least one air gap in which the magnetized part is placed, and at least two polar parts having an axial plane of symmetry and being arranged for co-operation with the magnetic poles of the magnetized part. Such motors are, for instance, described in the U.S. Pat. No. 4,330,727 of applicants. The structure of the magnetic circuits of these known motors generally does not allow obtaining optimum efficiency or an optimum relationship between the efficiency, the manufacturing costs and the space occupied by the motor. Furthermore, imperfections of the magnetization of the rotative part can have an unfavorable influence on the precision of the motor operation.

The present invention aims to improve the performance of a motor of the above mentioned type, and in particular to improve the efficiency of such a motor by reducing the losses in the magnetic circuits, as well as to obtain a reduction of the weight and of the space occupied by the motor, while allowing manufacturing in large quantities at a relatively low manufacturing cost. The invention further aims to improve the operation of the motor by equalizing the influence of the magnetic poles of the magnetized part.

To this effect, the motor according to the invention is characterized in that each magnetic stator circuit comprises a first and a second group of polar parts including each at least two polar parts, the axial planes of symmetry of the polar parts of each group forming between each other at least approximately an angle of $2k\pi/N$, k being a natural number, and the respective axial planes of symmetry of a polar part of the first group and of a polar part of the second group forming between each other at least approximately an angle of $(2r+1)\pi/N$, r being a natural number, the polar parts of said first group being coupled with at least one of said coils and the polar parts of said second group being coupled with at least one other of said coils, the coils coupled respectively with the polar parts of the two groups producing, in response to a given exciting current, magnetic fields having in the transversal direction of the magnetized part opposite directions for each of the two groups, each magnetic stator circuit comprising, or being coupled with, two yoke parts placed on either side of the magnetized part, so that the magnetic field produced in these circuits is substantially within the two space portions extending respectively above the magnetic poles of each face of the magnetized part.

The magnetized part can have substantially the form of a thin annular disk magnetized in the axial direction of the motor, the polar parts of the stator extending at least to the space portion above the annular magnetized zone of one of the surfaces of the disk.

According to a preferred embodiment, the polar parts of each stator circuit are arranged by pairs, the polar parts of each pair having respective axial planes of symmetry which are identical or shifted, one with respect to the other, by an angle not exceeding $\pi/3N$, two ends of the polar parts of each pair being arranged in facing relationship, so as to form an air gap in which the magnetized part is placed, the ends opposite to those forming the air gap being connected between each other by corresponding yoke parts and the coils being placed respectively around each assembly of polar parts of a same group placed on a same side of the magnetized disk.

The respective axial planes of symmetry of the polar parts of each pair can in particular be shifted, one with respect to the other, by an angle of $\pi/4N$ or $\pi/5N$. Furthermore, the axial planes of symmetry of the polar parts of each group can be arranged so that the axial planes of symmetry of at least two polar parts next to each other in the circumferential direction of the motor comprise an angle of $(2\pi \pm \pi/4)/N$, of $(2\pi \pm \pi/5)/N$ or $(2\pi \pm \pi/3)/N$. Moreover, the respective axial planes of symmetry of a polar part of the first group and of a polar part of the second group, on the same side of the magnetized part, can comprise an angle of $[2r+1)\pi \pm \pi/4]/N$. In a two-phase motor according to the invention, first and second groups of polar parts of the magnetic stator circuit or circuits associated with a first phase of the motor are arranged preferably in alternating relationship, respectively, with the first and second groups of polar parts of the circuit or circuits associated with the other phase of the motor. The motor according to the invention comprises advantageously at least a magnetic sensing means influenced by the magnetic poles of the magnetized part and arranged between the first and second groups of polar parts of a corresponding magnetic stator circuit, and the sensing means comprises preferably a sensing coil and two assemblies of magnetic sensing circuits coupled with the coil, these two magnetic circuits each having an air gap through which the rotary magnetized part moves, and having each a plane of symmetry parallel to the axis of rotation of the motor, these planes of symmetry comprising an acute angle open towards the axis of rotation, and the center points of the air gaps of the two magnetic sensing circuits being spaced by an angular distance, defined with respect to said axis of rotation, at least approximately equal to $(2\pi \pm \pi/3)/N$.

Figure 2:
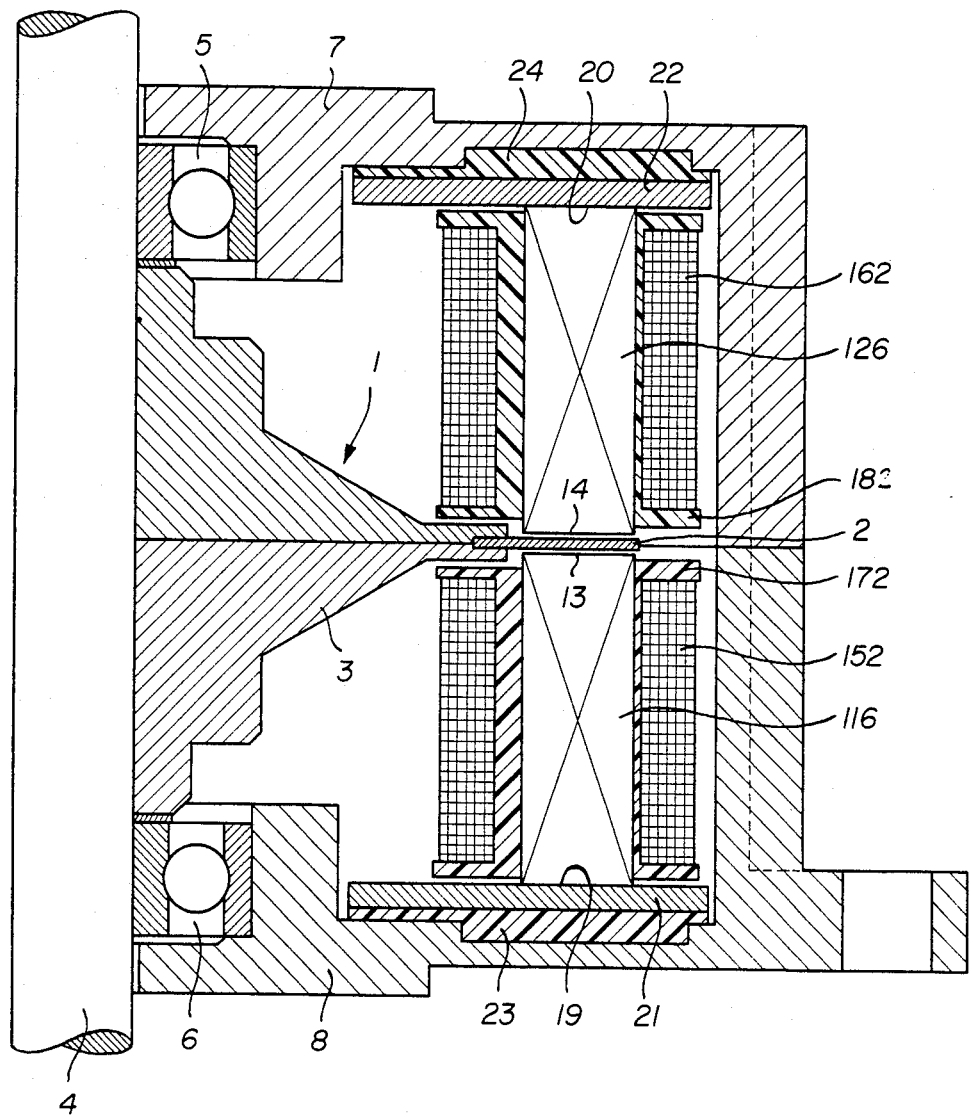
Figure 3:
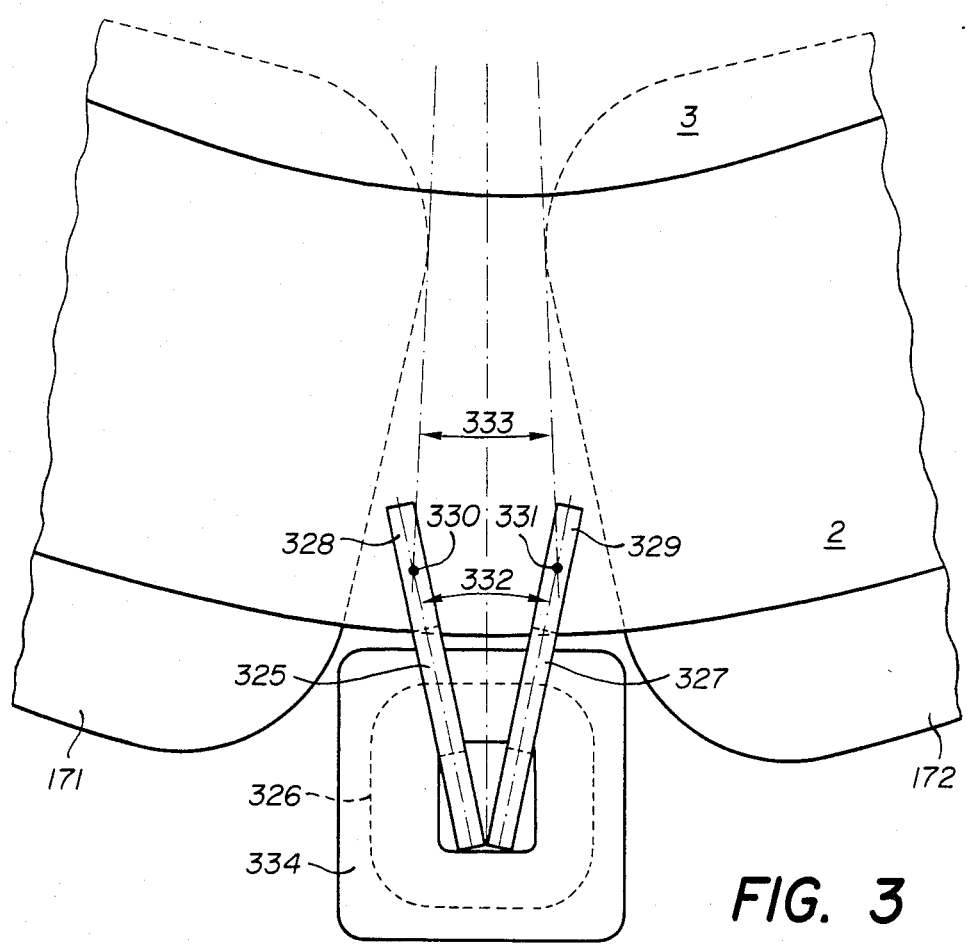
Figure 4:
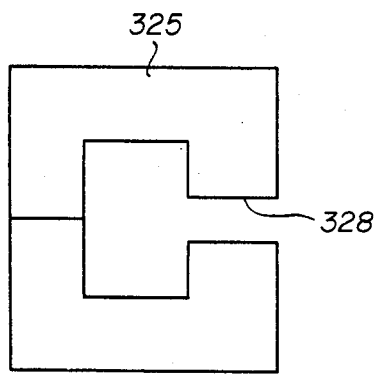
Figure 5:
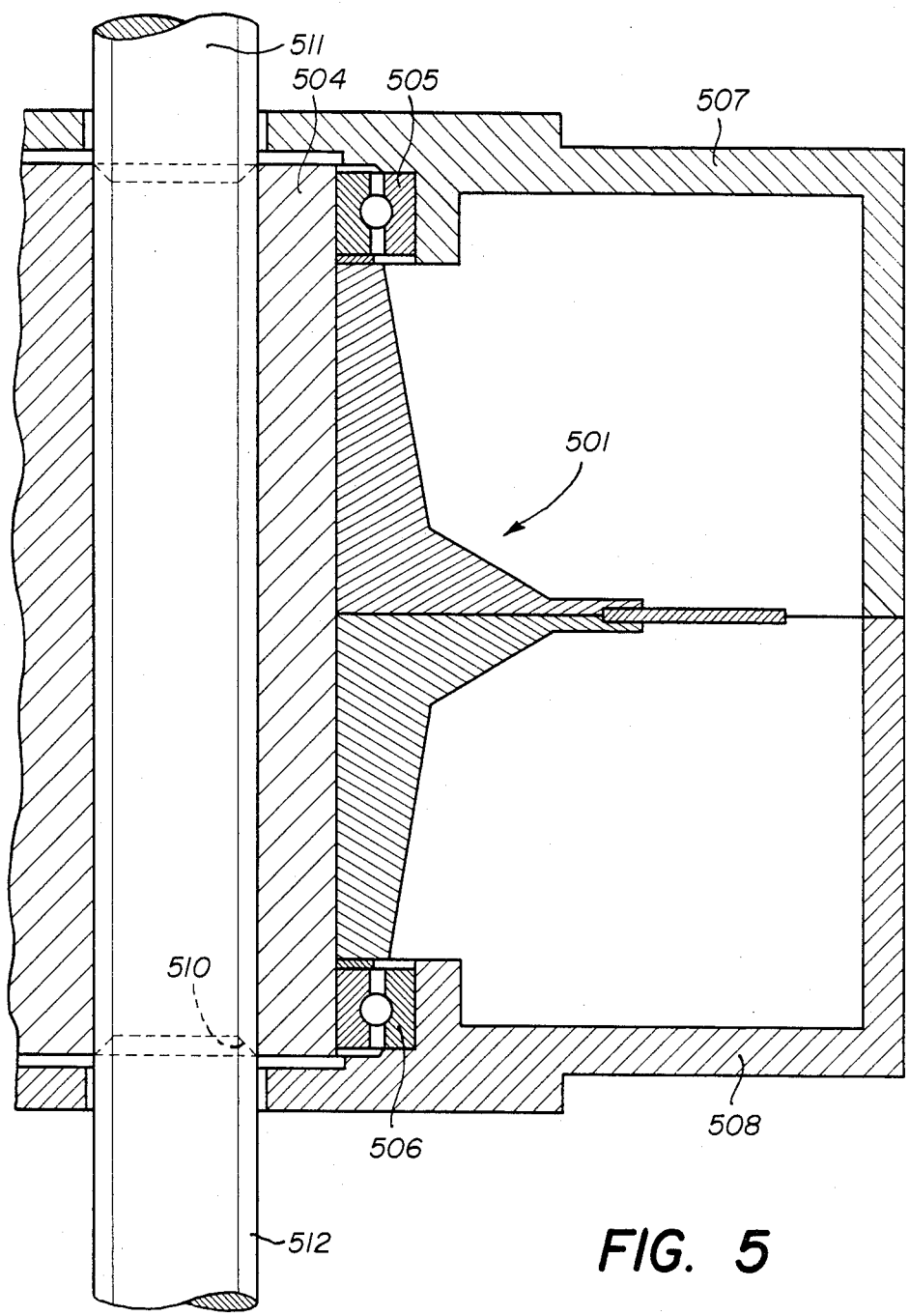

Other characteristics of the invention, as well as the properties and advantages obtained by it, will become apparent from the description given hereunder of various embodiments of the motor described by way of example and shown in the attached drawing in which:

FIG. 1 is a partial top view of the lower part of the stator of one embodiment of the motor of the invention, FIG. 2 is an axial sectional view of the motor partially represented in FIG. 1, along the broken line A-B-C-D-E-F, FIG. 3 is a partial top view of the rotor and of a portion of the stator showing a certain embodiment of a sensing means in a motor according to FIGS. 1 and 2, FIG. 4 is a side view of the magnetic circuit of the sensing means of FIG. 3, and FIG. 5 is a partial axial sectional view of another embodiment of the motor of FIG. 1.

FIGS. 1 and 2 show a stepper motor the rotary element 1 of which comprises an annular disk 2 from a hard magnetic material and a supporting flange 3 of a non magnetic material, for instance a light alloy or a plastic material. The rotary element 1 is mounted on a motor shaft 4, which shaft is supported by two bearings 5, 6 fixed in a casing 7, 8 of the motor. The disk 2 is magnetized axially so as to present on each of its faces 2N magnetic poles of alternating polarity arranged regularly along the free annular zone of the disk, N being a natural number, for instance equal to 50 in the case of the motor of FIG. 1.

The stator of the motor according to FIGS. 1 and 2 comprises four magnetic stator circuits of the same shape, the lower part of one of these circuits 9 being entirely visible on FIG. 1, said figure showing furthermore one half of the lower part of a neighbouring circuit 10.

Each stator circuit comprises a plurality of pairs of polar parts such as the pair 116, 126 of FIG. 2, formed by plates of magnetically permeable material or by an assembly of laminated sheets. The polar parts have an axial plane of symmetry designated by reference 100 in the case of polar part 116, and the free ends 13, 14 of one pair of polar parts such as 116, 126 form a narrow air gap in which moves the magnetized disk 2. Generally speaking, a plurality of pairs of polar parts, in the shown case 4 of them, form a group of polar parts, the polar parts placed on either side of the magnetized disk being respectively coupled with electric coils such as 152, 162. These coils are each supported by a coil support, or spool, such as 172 and 182, these coil supports also constituting a support for the corresponding polar parts.

Each stator circuit thus comprises a first and a second group of polar parts such as the groups 91, 92 represented in FIG. 1, in which the respective bottom polar parts of these groups, 111, 112, 113, 114 and 115, 116, 117, 118 can be seen. On either side of the magnetized disk the ends of the polar parts which are opposite to the ends forming the air gap, namely the ends 19, 20 shown in FIG. 2, are connected to each other by a respective yoke part from magnetically permeable material such as the yoke parts 21, 22.

In the preferred embodiment of the motor according to FIGS. 1 and 2, each stator circuit 9, 10, . . . comprises separate yokes and the same extent between the outer polar parts of the assembly of the two groups of each circuit, for instance the polar parts 111 and 118 for circuit 9. The different yoke parts are fixed to the casing 7, 8 of the motor through corresponding fixing parts such as 23, 24, the coil supports being fixed by conventional means to the corresponding yoke parts. FIG. 1 furher shows the coil support 171 of the bottom coil 151 of group 91.

A constructional variant using mechanically continuous yoke parts consists in providing saturable necks between the various circuits, so as to substantially separate these circuits from a magnetic point of view.

The axial planes of symmetry of the pairs of polar parts of a group form between each other an angle at least approximately equal to $2k\pi/N$, k being a natural number preferably equal to 1, which corresponds to a periodicity of the poles of same name appearing on the faces of the magnetized disk of the rotative part. The respective axial planes of symmetry of a polar part of the first group of polar parts and of a polar part of the second group of the same circuit form between each other an angle at least approximately equal to $(2r+1)\pi/N$, where r is a natural number, this corresponding to an angular shift such that, for example, the polar parts of the first group 91 and the polar parts of the second group 92 co-operate respectively with the poles of different names of the magnetized disk, and this being true for either side of the disk. In the case of FIG. 1, r takes the values from 1 to 4 depending on the considered polar parts of each group.

In each magnetic stator circuit the coils are energized, so that the magnetic field produced in the axial direction of the motor is of opposite polarity for the two groups of pairs of polar parts. Thus, in the top view of the lower part of the stator shown in FIG. 1, appear for example the poles N and S indicated on faces such as 13 of the polar parts of circuit 9 supposed energized. The magnetic field closes in each stator circuit through the two yoke parts, which is to say within planes which are parallel to that of the magnetized disk. This field is substantially contained within the two cylindrical annular space portions having as a base the magnetized part 2 and extending on either sides of the same.

The present configuration thus leads to magnetic circuits of a minimum length and comprising a minimum iron mass. As a consequence, losses of magnetic energy by hysteresis and eddy currents are considerably reduced, along with motor weight and required space, especially in the radial direction. It is also to be noted that the present structure allows taking full benefit of a magnetic orientation of the polar parts of the magnetic circuits.

The described arrangement further allows easily realizing a compensation of possible magnetization irregularities by which, for example on a same face of the magnetized disk, one series of poles predominates over the other.

The motor of FIGS. 1 and 2 is a two-phase motor in which the magnetic stator circuits associated with one of the phases are arranged so as to alternate with the magnetic circuits associated with the other phase of the motor; in the shown case, each phase comprises two stator circuits which are diametrically opposite.

In the present motor, the residual torque, namely the torque acting on the rotor in the absence of an electric current in the coils, due to the interaction between the magnetic poles of the magnetized disk with the polar parts of the stator, is greatly reduced. As a matter of fact its fundamental component becomes compensated by the arrangement of the two groups of polar parts in each magnetic circuit of the stator. The influences of the second order harmonic are compensated by the two-phase structure.

Furthermore a compensation of the components due to the fourth harmonic of the residual torque can be obtained in different alternative ways, namely:

inside each group of polar parts by a shifting of the respective axial planes of symmetry of the polar parts of the sub-groups formed by two polar parts following upon each other in the circumferential direction of the motor; this shifting is such that the axial planes of symmetry of the consecutive polar parts concerned form between each other an angle of $(2\pi\pm\pi/4)/N$; in the case where each group comprises an even number of polar parts in the circumferential direction, all consecutive axial planes of symmetry of the polar parts of said group form between each other said angle of $(2\pi\pm\pi/4)/N$;

regarding each stator circuit, by the shifting of the two groups of polar parts comprising the same. This shifting with respect to each other of the two groups, each taken as a whole, results in the fact that the respective axial planes of symmetry of a polar part of the first group, such as 111, and a polar part of the second group, such as 115, situated on the same side of the magnetized part, form between each other an angle of $[2r+1)\pi \pm \pi/4]/N$; such a compensation is of course made to the detriment of the compensation of the influence of the fundamental component which would require a precise angle of $(2r+1)\pi/N$;

regarding both halves of the motor in the case the same comprises pairs of polar parts such as the pair 116, 126 of FIG. 2; the polar parts placed on either sides of the plane of the magnetized disk can indeed be considered as forming half-stators; the desired compensation of the components of harmonic 4 is thus obtained by shifting the said two half-stators, in other words the respective axial planes of symmetry of the polar parts of each pair, by an angle of $\pm \pi/4N$ with respect to each other.

This last way of compensating can also apply to the compensation of components due to harmonics of third or fifth order of the torque due to the electric current. In these cases, the two half-stators are shifted by $\pm \pi/3N$ or by $\pm \pi/5N$, depending on whether the effect of harmonic 3 or 5 is to be eliminated.

According to another embodiment of the motor, these components of harmonics 3 and 5 are compensated within each group of polar parts, which compensation can further be combined to advantage with a compensation of components of harmonic 4 of the residual torque by means of the above mentioned shifting of half-stators.

To compensate harmonics 3 and 5 within a group of four polar parts such as for example 92, the axial planes of symmetry of consecutive polar parts are shifted with respect to each other in the circumferential direction of the motor so as to form sub-groups 115, 116 and 117, 118 comprising each two polar parts, so as to compensate the influence of harmonic 5, and, on the other hand, said two sub-groups are shifted one with respect to the other so as to compensate the influence of harmonic 3. In other words the planes of symmetry of polar parts 115, 116 and 117, 118 are shifted by $\pm \pi/5N$ with respect to their theoretical position corresponding to an angle of $2\pi/N$ between these planes of symmetry, and the axial planes of symmetry of sub-groups 115, 116 and 117, 118 considered each as a whole, are shifted one with respect to the other by an angle of $\pm \pi/3N$. The entire shifting operation is effected in such a way that the resulting shifting apart with respect to the theoretical position of the polar parts is as small as possible. Thus, in the present example, the signs of the shifting angles are selected so as to bring the polar parts within each sub-group nearer to each other and to bring each of the sub-groups nearer to each other, which results in corresponding angles of $(2\pi - \pi/5)/N$, $(2\pi - \pi/3 + \pi/5)/N$ and $(2\pi - \pi/5)/N$ between the consecutive planes of symmetry within the group of four polar parts.

It will be obvious for anyone skilled in the art that the desired compensation can be made in a similar way in the case of a different number of polar parts and that this compensation will be optimal when an even number of sub-groups and an even number of polar parts within each sub-group is available.

In a preferred embodiment the motor according to FIGS. 1 and 2 is provided with magnetic sensing means such as the one indicated in dashed lines on FIG. 1, which comprises a magnetic circuit 25 and a sensing coil 26 coupled with this circuit. The magnetic circuit 25 can have a usual C-shape in the axial plane to form an air gap arranged so as to co-operate with the magnetized zone of disk 2, the polar parts of the circuit being placed on either side of this disk. The circuit 25 and the coil 26 form thus a magnetic sensor in which signals are produced by induction when the magnetic poles of disk 2 are passing. An important advantage of the motor structure according to FIGS. 1 and 2 resides in the fact that this magnetic sensor can be placed between the two groups of polar parts of the magnetic stator circuit, namely in a zone where practically no magnnetic field exists which could affect the operation of the sensor. It results from FIG. 1 that such a sensor can easily be placed in the indicated position, since the circuit and the coil can be of small dimensions and the presence of the sensor does not in practice increase the room required by the whole motor.

A particularly advantageous embodiment of the sensor is illustrated in FIGS. 3 and 4. In FIG. 3 a part of the motor is represented in a top view showing in particular the magnetized part or rotor 2 with its support 3 and the carcases 171, 172 of the two coils of circuit 9 of FIG. 1. The sensing device comprises a coil 326 indicated in dashed lines in a support 334 and two magnetic circuits 325, 327 being coupled with this coil. These circuits are formed by sheet metal or by an assembly of metal sheets and have a C-shape such as shown in FIG. 4 for the circuit 325. Each C-shaped circuit is realized in two parts to allow, in this example, mounting the coil support 324, coil 326 being placed around the vertical continuous C-legs as shown in FIG. 3 and the open legs of the C forming two polar parts such as the upper polar part indicated by reference 328 in FIG. 4. The polar parts form an air gap in which passes a portion of the magnetized part 2 of the rotor.

In the present embodiment two magnetic circuits 325 and 327 having each a plane of symmetry parallel to the rotor axis, are placed in such a way that these planes of symmetry form an acute angle 332 which is open towards the axis, said angle being symmetrical with respect to an axial plane and chosen in the following way. If 330 and 331 designate respectively the centers of the polar surfaces such as 328 and 329 of circuits 325 and 327, the angular distance 333 between these centers, as defined by the angle formed with the axis of the rotor, is at least approximately equal to $(2\pi \pm \pi/3)/N$. This allows realizing a satisfactory compensation of the third order harmonic in the electromotive force induced in coil 226. Furthermore, the inclination of the planes of symmetry of the magnetic circuits with respect to an axial reference plane is determined so as to also notably reduce the fifth order harmonic by compensation between the two magnetic circuits.

It is obvious that other types of magnetic sensors, for example HALL effect sensors, can be used with the same advantage resulting from the position thereof in a magnetically neutral zone of the stator.

FIG. 5 shows an axial section of a motor case in two parts 507, 508, similar to that of FIG. 2, with a rotary member designated as a whole by 501. The magnetic stator circuits and the coils are not illustrated to simplify the drawing. The motor shaft 504 is realized, in this example, in the form of a cylindrical tube supported in the case by bearings 505, 506.

The inner part of tube 504 is provided with an endless screw thread 510. The tubular shaft 504 is made to co-operate with a shaft 511 provided with a thread 512 corresponding to thread 510, and said shaft is guided longitudinally so as to be prevented from turning about its axis by means not represented, but well known by any person skilled in the art. Thus, when the tubular shaft 504 of the motor is rotating, a longitudinal motion of translation of shaft 511 is obtained. The motor described in the various foregoing examples is particularly well adapted to such a use of its shaft, since the active parts of the motor only occupy a space relatively far away from the axis, so that the shaft can have a rather large diameter without leading to an increase of the outer dimensions of the motor.

I claim:

1. An electrical stepper motor comprising on the one hand a permanently magnetized rotative part which is mounted on the motor shaft and presents a rotatory symmetry about the same, this part having a small thickness as compared to its outer diameter and being magnetized in the direction of its thickness so as to present on each of its opposite faces 2N magnetic poles of alternating polarity, N being a natural number, these poles being arranged regularly along an annular zone, and comprising on the other hand, at least one magnetic stator circuit and at least two electric coils coupled with this magnetic circuit, each circuit comprising at least one air gap in which the magnetized part is placed, and at least two polar parts having an axial plane of symmetry and being arranged for co-operation with the magnetic poles of the magnetized part, characterized in that each magnetic stator circuit (9, 10, ...) comprises a first (91) and a second (92) group of polar parts including each at least two polar parts (111, 112; 115, 116), the axial planes of symmetry of the polar parts of each group forming between each other at least approximately an angle of $2k\pi/N$, k being a natural number, and the respective axial planes of symmetry of a polar part (111) of the first group and of a polar part (115) of the second group forming between each other at least approximately an angle of $(2r+1)\pi/N$, r being a natural number, the polar parts of said first group being coupled with at least one of said coils (151) and the polar parts of said second group being coupled with at least one other of said coils (152), the coils coupled respectively with polar parts of the two groups producing, in response to a given exciting current, magnetic fields having in the transversal direction of the magnetized part, opposite directions for each of the two groups, each magnetic stator circuit comprising or being coupled with two yoke parts (21, 22) placed on either side of the magnetized part (2), so that the magnetic field produced in these circuits is substantially within the two space portions extending respectively above the magnetic poles of each face of the magnetized part.

2. Motor according to claim 1, characterized in that the magnetized part has substantially the form of a thin angular disk (2) magnetized in the axial direction of the motor, the polar parts of the stator (111, ..., 115, ...) being arranged at least in their space portion extending above the angular magnetized zone of one of the disk surfaces.

3. Motor according to claim 2, characterized in that the polar parts of each stator circuit are arranged by pairs, the polar parts of each pair (...; 116, 126;...) having respective axial planes of symmetry which are identical or shifted one with respect to the other by a maximum angle of $\pi/3N$, two ends (13, 14) of the polar parts of each pair being arranged in opposite relationship so as to form an air gap in which is arranged the magnetized part (2), the ends (19, 20) opposite to those forming the air gap being connected to each other by respective yoke parts (21, 22) and coils 152, 162) being placed respectively about each assembly of polar parts of a same group placed on a same side of the magnetized disk.

4. Motor according to claim 3, characterized in that the respective axial plane of symmetry of the polar parts of each pair are shifted with respect to each other by an angle of $\pi/4N$.

5. Motor according to claim 3, characterized in that the axial plane of symmetry of each pair are shifted with respect to each other by an angle of $\pi/5N$.

6. Motor according to one of the claim 1, characterized in that the axial planes of symmetry of the polar parts of each group are arranged in such a way that the axial planes of symmetry of at least two consecutive polar parts in the circumferential direction of the motor form between each other an angle of $(2\pi \pm \pi/4)/N$.

7. Motor according to claim 6, characterized in that each group comprises an even number of polar parts in the circumferential direction of the motor and that the axial planes of symmetry of consecutive polar parts form between each other angles of $(2\pi \pm \pi/4)/N$.

8. Motor according to one of the claim 1, characterized in that the axial planes of symmetry of the polar parts of each group are arranged in such a way that the axial planes of symmetry of at least two consecutive polar parts in the circumferential direction of the motor form between each other an angle of $(2\pi \pm \pi/5)/N$.

9. Motor according to claim 8, characterized in that each group comprises an even number of polar parts in the circumferential direction of the motor and that the axial planes of symmetry of consecutive polar parts form between each other angles of $(2\pi \pm \pi/5)/N$.

10. Motor according to one claim 1, characterized in that the axial planes of symmetry of the polar parts of each group are arranged in such a way that the axial planes of symmetry of at least two consecutive polar parts in the circumferential direction of the motor form between each other an angle of $(2\pi \pm \pi/3)/N$.

11. Motor according to one of claim 1, characterized in that each group comprises four polar parts in the circumferential direction of the motor, and the axial planes of symmetry of each group of four consecutive polar parts form between each other respective angles of $(2\pi - \pi/5)/N$, $(2\pi - \pi/3 + \pi/5)/N$ and $(2\pi - \pi/5)/N$.

12. Motor according to claim 1, characterized in that the respective axial planes of symmetry of a polar part (111) of the first group and a polar part (115) of the second group placed on the same side of the magnetized part, form between each other an angle of $[(2r+1)\pi \pm \pi/4]/N$.

13. Motor according to claim 1, constituting a two-phase motor, characterized in that it comprises at least two magnetic circuits associated with one of the motor phases being arranged in alternating relationship with the magnetic circuits associated with the other motor phase.

14. Motor according to claim 1, characterized in that the yoke parts extend between the extreme polar parts of two groups of polar parts of each corresponding magnetic stator circuit.

15. Motor according to claim 14, characterized in that the yoke parts present a lamellar structure.

16. Motor according to claim 1, characterized in that its shaft is realized in the form of a cylindrical tube the inner wall of which is provided with an endless screw thread.

17. Motor according to claim 1, characterized in that it comprises at least one magnetic sensing member (25, 26) influenced by the magnetic poles of the magnetized part and arranged between the first and second group of polar parts (91,92) of a corresponding magnetic stator circuit (9).

18. Motor according to claim 17, characterized in that the sensing member comprises a sensing coil (326) and two parts or assemblies of magnetic sensing circuits (325, 327) coupled with this coil, these two magnetic circuits having each an air gap in which passes the rotative magnetized part (2), and having each a plane of symmetry parallel to the axis of rotation of the motor, these planes of symmetry forming between each other an acute angle (332) open towards the axis of rotation and the centers (330, 331) of the air gaps of the two magnetic sensor circuits being spaced by an angular distance (333) defined with respect to said axis of rotation, at least approximately equal to $(2\pi \pm \pi/3)/N$.

* * * * *